2,868,270
APPARATUS FOR VULCANIZING ORNAMENTAL TRIM ON TIRE WALLS

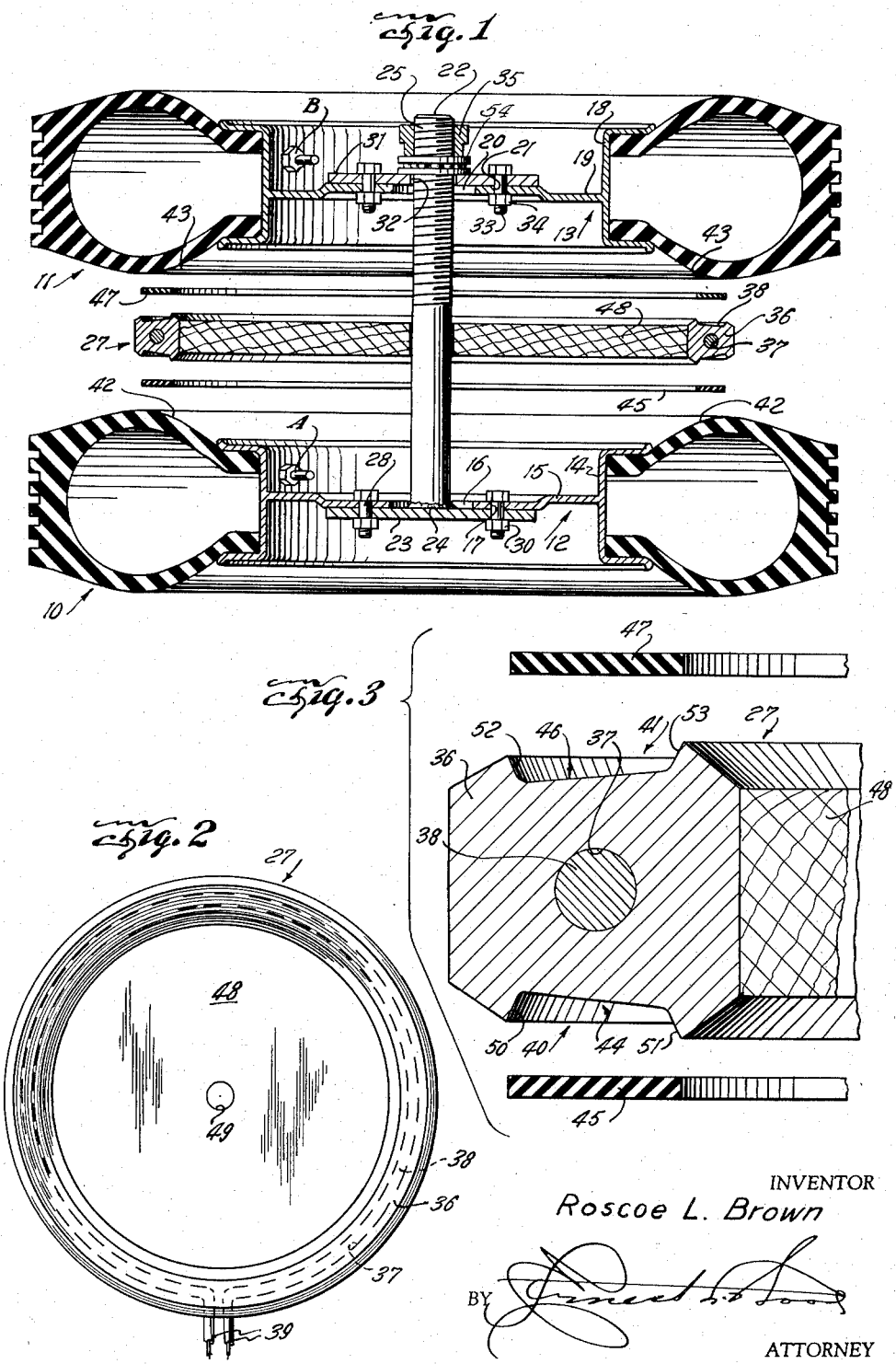

Roscoe L. Brown, Garland, Tex.

Application August 22, 1955, Serial No. 529,861

2 Claims. (Cl. 154—9)

This invention relates to the art of vulcanizing and it has particular reference to an apparatus and method for vulcanizing ornamental trim to the side walls of pneumatic tire casings.

The principal object of the invention is to provide a simple device by which an ornamental trim, in the form of an annular ribbon of rubber of any desired color, may be applied concentrically to a side wall of a tire casing in a minimum of time and at little cost.

Another object of the invention is to provide a device for vulcanizing ornamental trim to tires wherein a pair of tires, to which the trim is to be simultaneously vulcanized, constitute in themselves the elements of the combination by which the necessary pressure is applied in the vulcanizing process, one of the tires being inflated and the other deflated at the outset with an annular heating element interposed therebetween and flanked by rubber ring trims, the heating element and trims being subjected to counter pressures upon inflation of the deflated tire preliminary to the application of heat.

Other objects will become manifest as the description proceeds when considered with the annexed drawing wherein:

Figure 1 is a vertical sectional view including conventional tires and showing parts in separated relationship.

Figure 2 is a plan view of the heating element per se and a circular template for centering the heating element in relation to the tires, and Figure 3 is a fragmentary sectional view of the heating element on a larger scale, flanked by like sections of rubber trim.

Continuing with a more detailed description of the drawing, reference numeral 10 denotes generally a conventional pneumatic tire and 11, an identical pneumatic tire. These tires constitute a complementary part of the combination since they are essential in carrying out the hereindescribed method of vulcanizing ornamental trim to the tires.

The tire 10 is mounted on the conventional wheel broadly designated by reference numeral 12 and in like manner, the tire 11 is mounted on a conventional wheel 13. The wheel 12 is composed of the rim 14 and flange 15 having the usual opening 16 in its center, surrounded by lug bolt holes 17. The wheel 13 is identical to wheel 12, the same having a rim 18, flange 19 provided with a central opening 20 and annularly spaced lug bolt holes 21.

The invention includes a stem 22 which has a flat plate 23 affixed to one of its ends as by welding at 24. The stem has threads 25 extending from its opposite end to a point near its midsection, as shown in Figure 1.

The stem or bolt 22 is adapted to hold the two wheels 12 and 13 and their respective tires 10 and 11 in relative parallel planes so that the confronting side walls 42 and 43, respectively, may be brought into engagement with a heating element, generally indicated by reference numeral 27, interposed between the tires 10 and 11. Further reference to this heating element will be made presently.

The plate 23 carried by one end of the stem 22 is secured to the flange 15 of wheel 12 by bolts 28 passing through holes in the plate 23 matching with the holes 17 of the wheel flange 15. Nuts 30 are threaded onto the bolts 28 to hold the plate secure. A second plate 31 has an opening 32 in its center which freely receives the stem 22. This plate 31 also has annularly spaced holes matching the lug bolt holes 21 of the flange 19 of wheel 13 and is secured to this flange by bolts 33 passing through these matching holes and onto which nuts 34 are threaded. A hex nut 35 is threaded onto the upper end of the stem 22 and bears against the top of the plate 31 when a wrench is applied to rotate the nut, thus to move the wheel 13 toward the wheel 12.

The heating element 27 consists of a metal ring 36 having annular passage 37 through which an electrical heating element 38 passes and which has connected thereto electrical leads 39 (Figure 2) for supplying current from a source, not shown. Obviously, the passage 37 may carry steam with equal facility if it is desired to use steam as the heating agent.

The converse surfaces 40 and 41 (Figure 3) of the ring 36 are sloped approximately 5° to conform to the corresponding inclination of the side walls 42 and 43 of the tires 12 and 13, respectively. The face 40 of the ring 36 has a shallow, annular recess 44 which is adapted to receive an annular strip 45 of rubber of any desired color, usually white. Similarly, the opposite face 41 of the ring 36 has an annular recess 46, receiving an annular strip 47 of rubber, identical to the strip 45.

In order to insure positive concentricity of the heating element ring 36 with the tires 10 and 11, a circular template 48, preferably plywood, is made to fit within the ring 36 and has a central opening 49 (Figure 2) which receives the stem 22.

To assemble the above described elements, the stem 22 is secured to the flange 15 of wheel 12 through the rigid plate 23 and bolts 28. The rubber strips 45 and 47 are pressed into the respective recesses 44 and 46 of the ring 36 of the heating element 27. The template 48 is then pressed into the ring 36 and placed on the stem 22, the latter extending through the central opening 49 of the template to correctly position the heating element 27 and the rubber strips 45 and 47 concentrically with respect to the side walls 42 and 43 of the tires 12 and 13, respectively.

The tire 10 is first inflated with air to approximately 35 pounds through its valve A while the tire 11 remains uninflated. The wheel flange 19, carrying the plate 31, is placed over the stem 22 and the nut 35 is threaded onto the stem. The nut 35 is rotated until the heating element and the rubber strips carried thereby are firmly clamped between the two tires 10 and 11. When the parts are in this position, the tire 11 is inflated through its valve B to approximately 35 pounds. This provides that the rubber ornamenting rings 45 and 47 will be under sufficient pressure to insure complete union of the rubber rings with the rubber of the side walls 42 and 43 of the tires 10 and 11, simultaneously when heat is applied to raise the temperature of the ring 36 the required amount to vulcanize the rubber rings 45 and 47 to the side walls of the tires.

After a required interim, the tire 11 is deflated and the nut 35 backed off the stem 22 so that wheels 12 and 13 can be removed and placed on the axles of a vehicle with their ornamented side walls on the outside.

It will be observed in Figure 3 that the opposing sides 50 and 51 of the annular recess 44 and the opposing sides 52 and 53 of the annular recess 46 of the heating element ring 36 are all upwardly divergent. Moreover, where the sides merge with the bottoms of the recesses there is provided a slight radius to insure against sharp angles on the exposed surfaces of the ornamental rings 45 and 47 which would be subject to undue wear. Instead, all exposed surfaces of the strips are smoothed and their edges beveled.

In the event it is desired to apply the ornamental rubber strips 45 and 47 to the tires 10 and 11 with both tires inflated, a thrust ball bearing 54 is interposed between the upper plate 31 and the nut 35 so that the latter may be turned on the threads 25 of the stem 22 without frictional resistance which would obtain if the nut 35 were in direct contact with the plate 31. With both tires inflated, the nut 35 is turned until it is finger-tight, whereupon a wrench is applied to the nut and turned until the circular rubber strips 45 and 47 are under the required compression for vulcanizing, whereupon the heating element 27 is energized to apply the rubber strips permanently to the tire walls 42 and 43.

It is evident from the foregoing that rings of rubber of colors differing from that of the side wall of a tire may be permanently affixed to the side wall of two tires at once, thereby providing ornamentation pleasing to the eye, yet requiring but a short time to so embellish all of the tires of a vehicle.

While the particular form of the invention is set forth in the appended method and apparatus, claims and calculated to carry out the recited objects of the invention, it is understood that certain changes and modifications may be made without departing from the spirit and intent of the invention.

What is claimed is:

1. Apparatus for applying ornamental rubber rings to the side walls of pneumatic tire casings comprising, in combination with a pair of wheels each having a rim adapted to receive a tire to be operated upon and a flange formed integrally with the rim and having a central opening surrounded by circumferentially spaced lug bolt holes, means for clamping the wheels, each with a tire mounted thereon, together in side by side relation to each other comprising a pair of flat circular plates each having circumferentially spaced holes corresponding to the lug bolt holes of the wheel flanges, one of the plates having a central opening therein, a plurality of bolts each inserted through one of the lug bolt holes of a wheel flange and one of the holes of a plate whereby each of the plates is removably connected to one of the wheel flanges, a pin having a threaded end portion rigidly connected at its opposite end to the center of one of the plates, at right angles to the plane thereof, the threaded end portion of the pin being passed through the central opening of the other plate, and a nut threaded on the pin and acting on the last mentioned plate whereby pressure may be applied to the opposed side walls of the tires upon tightening the nut, an annular heating element having sloped sides for engagement with the opposed side walls of the tires and having an annular recess in each side adapted to receive an annular strip for attachment to the side wall of one of the tires, and a circular template having its circumference in frictional engagement with the heating element, the template having a central opening surrounding the pin whereby the heating element is aligned concentrically with the wheels.

2. In apparatus as described in claim 1, a thrust bearing surrounding the pin and positioned between the nut and the adjacent plate.

References Cited in the file of this patent

UNITED STATES PATENTS

| | | |
|---|---|---|
| 1,989,676 | Bodle | Feb. 5, 1935 |
| 2,429,786 | Wright | Oct. 28, 1947 |
| 2,479,229 | Goodman | Aug. 16, 1949 |
| 2,686,554 | Hinman | Aug. 17, 1954 |
| 2,802,512 | Rouse | Aug. 13, 1957 |